May 26, 1925.
R. E. FRICKEY
1,539,044
ALTERNATING CURRENT WELDING APPARATUS
Filed July 18, 1921
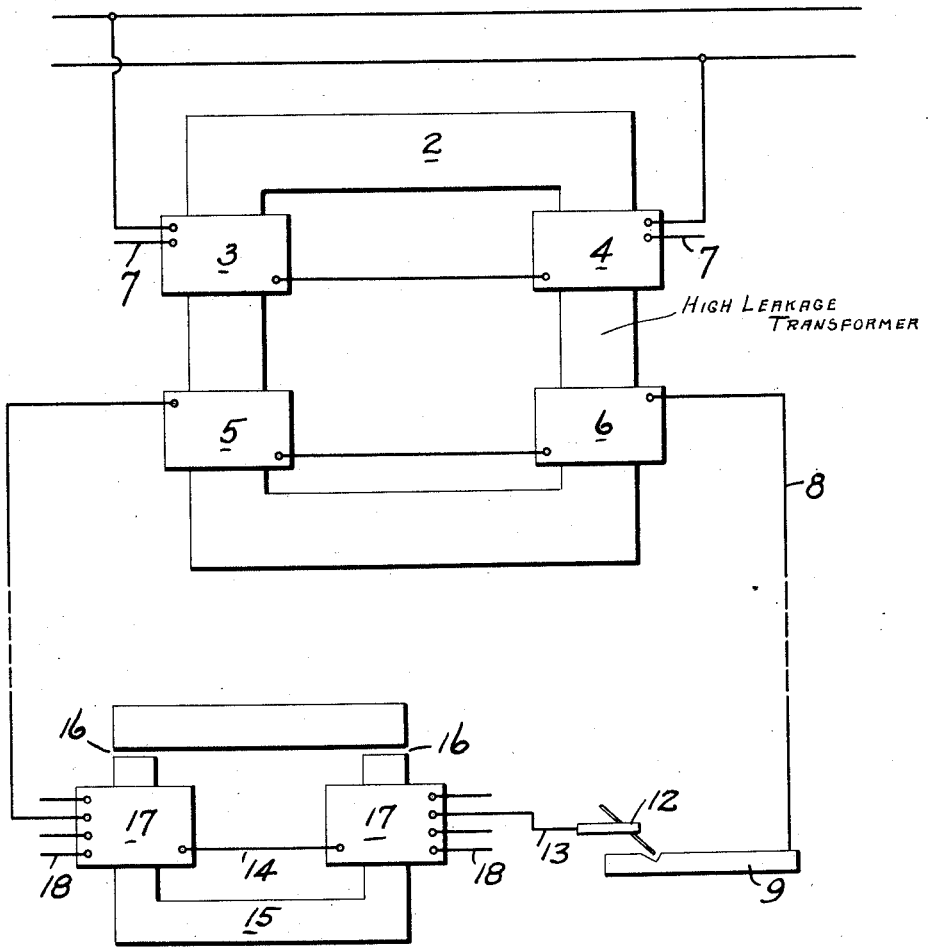

Patented May 26, 1925.

1,539,044

UNITED STATES PATENT OFFICE.

ROYAL E. FRICKEY, OF SAN FRANCISCO, CALIFORNIA.

ALTERNATING-CURRENT WELDING APPARATUS.

Application filed July 18, 1921. Serial No. 485,658.

*To all whom it may concern:*

Be it known that I, ROYAL E. FRICKEY, a citizen of the United States, and a resident of the city and county of San Francisco, State of California, have invented a certain new and useful Alternating-Current Welding Apparatus, of which the following is a specification.

The invention relates to alternating current welding apparatus and particularly to the control of the welding current.

An object of the invention is to provide an alternating current welding apparatus which is simple and inexpensive in construction and which may be readily adjusted to provide the desired welding current for the operation to be performed.

Another object of the invention is to provide a transformer which limits the welding current to a predetermined maximum.

A further object of the invention is to provide means external to the transformer and adjacent the welding tool for adjusting the welding current.

The invention possesses other advantageous features, some of which, with the foregoing, will be set forth at length in the following description where I shall outline in full, that form of the invention which I have selected for illustration in the drawing accompanying and forming part of the present specification.

The drawing is a diagrammatic representation of the apparatus of my invention.

Alternating current welding apparatus, several forms of which have already been proposed, comprises primarily a transformer provided with means for varying the value of the secondary or welding current. During the welding operation it is necessary that the value of the welding current be frequently adjusted, requiring the operator to move from his work to the transformer. These transformers are usually very heavy and for that reason are more or less permanently placed, requiring the operator to frequently walk a considerable distance to accomplish the necessary adjustment. In accordance with my invention, I provide a control device which is comparatively light, so that it may be readily moved about the work by the operator, thus enabling him to adjust the welding current without departing from his work. My invention consists primarily of a transformer in combination with an external regulator. The transformer is designed with an internal leakage reactance of such value that the secondary or welding current will be limited to a predetermined maximum. The external regulator is preferably a variable reactance, so that the welding current may be adjusted to any desired value up to the maximum obtainable from the transformer.

The transformer is of simple construction and requires no taps or other internal regulating means for adjusting the welding current. The transformer comprises preferably a closed laminated iron core 2 upon which the primary and secondary windings are arranged, the windings being separated the proper distance to obtain the required leakage reactance. In the drawings I have shown a primary winding comprising two coils 3 and 4, one arranged on each leg of the core and the secondary winding formed in two coils 5 and 6, one arranged on each leg of the core. It is not essential, however, that the coils be arranged in this manner, since the primary winding may be arranged on one leg and the secondary on the other, or the windings may be concentric and properly spaced or otherwise arranged to provide the required leakage reactance. The primary of the transformer is preferably wound for distribution line voltage, so that it may be installed on a pole or in a manhole and is preferably provided with taps 7 for accommodating variable line voltage.

One side of the secondary winding is connected by the conductor 8 to the work or article 9 to be welded and the other side is connected to the welding tool 12 by the conductor 13, in which the regulator 14, is arranged. The welding current is preferably controlled by varying the reactance of the regulator, which is light and portable and positioned adjacent the work. The regulator shown, comprises a laminated iron core 15 having small air gaps 16 therein to increase the leakage reactance. Arranged on the legs of the core are coils 17, connected in series in the conductor 13, and provided with means for varying the number of turns of the coils in circuit. In the drawings, I have shown the coils provided with taps 18, for the purpose of providing means for varying the reactance, but this may be accomplished in other ways, such as by reversing one coil with respect to the other and providing means for varying the distance between them, or by varying the length of the air gap.

I claim:

1. In alternating current welding system, a transformer of high leakage reactance having a primary and a secondary winding, means for connecting the secondary winding so that it supplies a welding current, and a variable reactor of comparatively small weight in the secondary circuit, whereby an operator using the apparatus may perform the control for the current at any convenient location.

2. An alternating current welding apparatus, including a transformer having a magnetizable core with primary and secondary windings thereon, the windings being spaced to provide such leakage reactance in the transformer that the secondary current will not exceed a predetermined magnitude, a welding circuit including a welding tool connected to said secondary winding and means in said welding circuit adjacent the welding tool for varying the reactance of the welding circuit.

In testimony whereof, I have hereunto set my hand.

ROYAL E. FRICKEY.